(12) United States Patent
Kubo et al.

(10) Patent No.: US 12,397,251 B2
(45) Date of Patent: Aug. 26, 2025

(54) FLUID DEVICE

(71) Applicant: SEIKO EPSON CORPORATION

(72) Inventors: Keita Kubo, Matsumoto (JP); Chikara Kojima, Matsumoto (JP); Tomohide Onogi, Shiojiri (JP); Mitsuru Miyasaka, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 330 days.

(21) Appl. No.: 18/045,536

(22) Filed: Oct. 11, 2022

(65) Prior Publication Data

US 2023/0111845 A1 Apr. 13, 2023

(30) Foreign Application Priority Data

Oct. 11, 2021 (JP) ................... 2021-166691

(51) Int. Cl.
*B01D 43/00* (2006.01)
*C02F 1/36* (2023.01)
*G01N 15/1404* (2024.01)

(52) U.S. Cl.
CPC ............ *B01D 43/00* (2013.01); *C02F 1/36* (2013.01); *G01N 15/1404* (2013.01); *C02F 2307/12* (2013.01); *G01N 2015/142* (2013.01)

(58) Field of Classification Search
CPC ........ B01D 46/00; B01D 54/34; B01D 21/28; B01D 43/00; B01D 51/08; C02F 1/32; C02F 1/36; C02F 1/30; C02F 1/40; C02F 1/72; C02F 1/78; G01N 15/14; F15D 1/00
See application file for complete search history.

(56) References Cited

U.S. PATENT DOCUMENTS

| | | | |
|---|---|---|---|
| 2003/0234274 A1* | 12/2003 | Minter | C02F 1/36 228/110.1 |
| 2010/0163129 A1 | 7/2010 | Tokita et al. | |
| 2010/0224274 A1 | 9/2010 | Tokita et al. | |

FOREIGN PATENT DOCUMENTS

| | | |
|---|---|---|
| JP | 2001353889 A | 12/2001 |
| JP | 2008274932 A | 11/2008 |
| JP | 2009031069 A | 2/2009 |
| JP | 2014091195 A | 5/2014 |

OTHER PUBLICATIONS

Royal Society Open Science 6, 181776.
Office Action for JP Patent Application No. 2021166691, issued on Apr. 22, 2025, 6 pages.

* cited by examiner

*Primary Examiner* — Patrick Orme
(74) *Attorney, Agent, or Firm* — CHIP LAW GROUP

(57) ABSTRACT

A fluid device includes: a flow path through which a fluid flows; and an ultrasonic wave application device including an ultrasonic element that transmits an ultrasonic wave, in which the flow path has, as flow path wall surfaces, an ultrasonic wave application surface that applies, to the fluid, the ultrasonic wave transmitted from the ultrasonic element, and a reflection surface that reflects the ultrasonic wave applied to the fluid from the ultrasonic wave application surface, and the reflection surface has a concave curved surface shape.

6 Claims, 7 Drawing Sheets

FLUID DEVICE

The present application is based on, and claims priority from JP Application Serial Number 2021-166691, filed Oct. 11, 2021, the disclosure of which is hereby incorporated by reference herein in its entirety.

BACKGROUND

1. Technical Field

The present disclosure relates to a fluid device.

2. Related Art

In the related art, a fluid device that performs acoustic focusing on micro-particles in a fluid is known.

For example, a fluid device disclosed in NPL 1 (Nobutoshi Ota and other six persons, "Enhancement in acoustic focusing of micro and nanoparticles by thinning a microfluid device", Royal Society Open Science, Vol. 6, no. 2, Article No. 181776, December, 2019) includes a flow path substrate (glass substrate) on which a flow path is formed, and a piezoelectric element provided on the flow path substrate. An ultrasonic wave generated by the piezoelectric element is transmitted into the flow path via the flow path substrate, and a standing wave is generated in the fluid in the flow path. The micro-particles in the fluid are captured within a predetermined range in the flow path due to a pressure gradient of the fluid formed by the standing wave.

The fluid device described in the above NPL 1 causes the micro-particles in the fluid to converge by the standing wave generated by the ultrasonic wave, but it is difficult to form a fluid device capable of stably capturing the micro-particles at a desired position since a generation condition of the standing wave varies due to disturbance.

SUMMARY

A fluid device according to a first aspect of the present disclosure includes a flow path through which a fluid flows and an ultrasonic element that transmits an ultrasonic wave, in which the flow path has an ultrasonic wave application surface that applies, to the fluid, the ultrasonic wave transmitted from the ultrasonic element, and a reflection surface that reflects the ultrasonic wave applied to the fluid from the ultrasonic wave application surface, and the reflection surface has a concave curved surface shape.

In the fluid device according to the first aspect, the reflection surface may have a parabolic shape that forms a focal point in the flow path in a cross-sectional view in a plane intersecting a flow direction of the fluid.

In the fluid device according to the first aspect, the ultrasonic wave application surface may face the reflection surface.

In the fluid device according to the first aspect, the ultrasonic wave application surface may face the reflection surface, and the ultrasonic wave application surface and the reflection surface may have a concentric arc shape centered on a virtual point in the flow path in the cross-sectional view in the plane intersecting the flow direction of the fluid.

The fluid device according to the first aspect may further include: a plurality of the ultrasonic elements, in which the flow path may include a plurality of the ultrasonic wave application surfaces that apply a corresponding ultrasonic wave from the plurality of ultrasonic elements to the fluid, and a plurality of the reflection surfaces that face the plurality of ultrasonic wave application surfaces, and the plurality of ultrasonic wave application surfaces and the plurality of reflection surfaces may have concentric arc shapes centered on a same virtual point in the cross-sectional view.

In the fluid device according to the first aspect, phases of the ultrasonic waves transmitted from the plurality of ultrasonic elements may coincide with one another.

In the fluid device according to the first aspect, the flow path may have a circular flow path cross section, and $$\sqrt{\frac{4cD}{1.37f}} < w < \frac{D}{2},$$

in which D is a diameter of the flow path cross section, f is a frequency of the ultrasonic wave, c is a sound velocity of the ultrasonic wave, and w is a width of the ultrasonic wave application surface.

DESCRIPTION OF EXEMPLARY EMBODIMENTS

First Embodiment

Hereinafter, a fluid device according to a first embodiment will be described.

Figure 1:
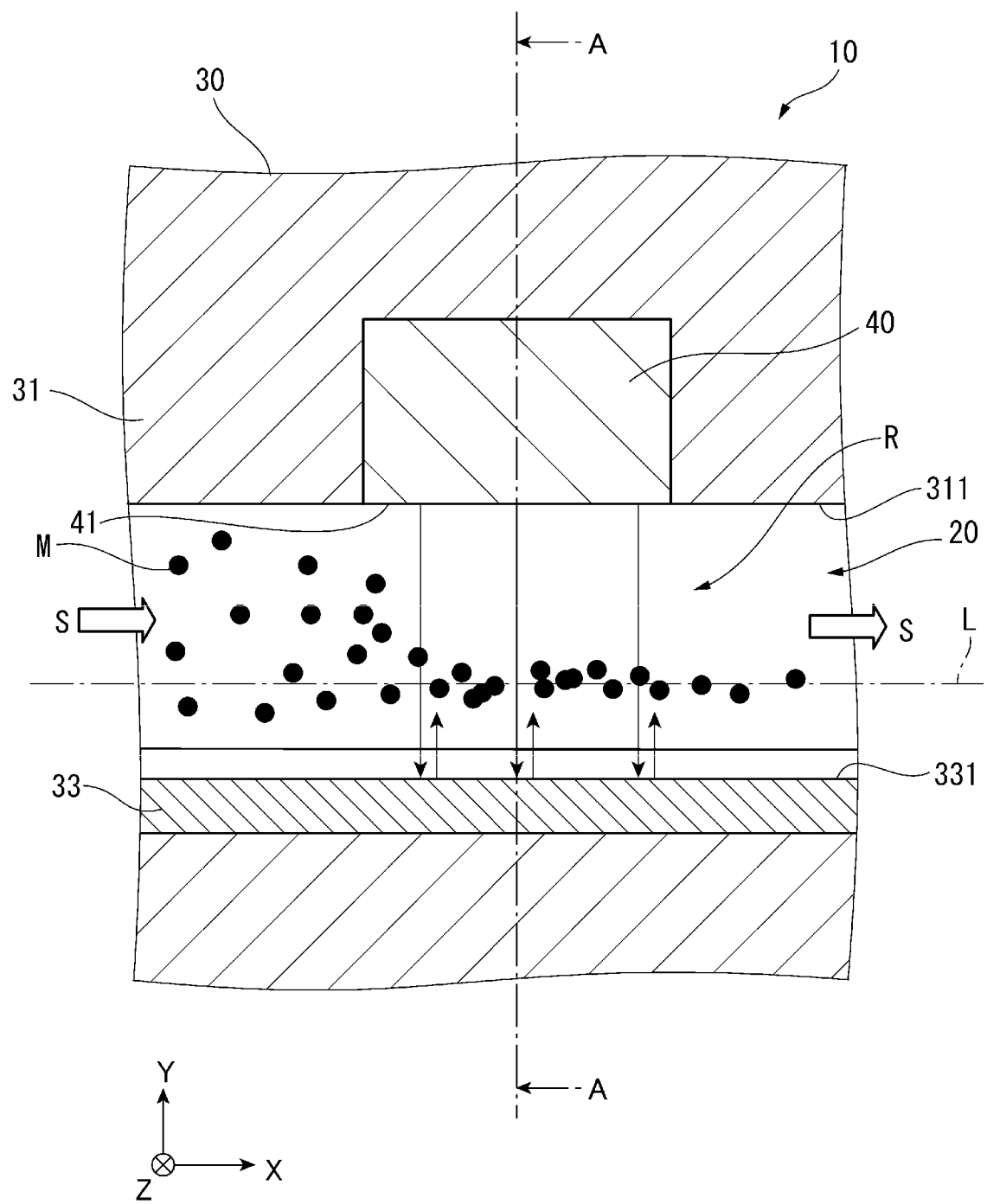
FIG. 1 is a cross-sectional view schematically showing a part of a fluid device according to a first embodiment.
Figure 2:
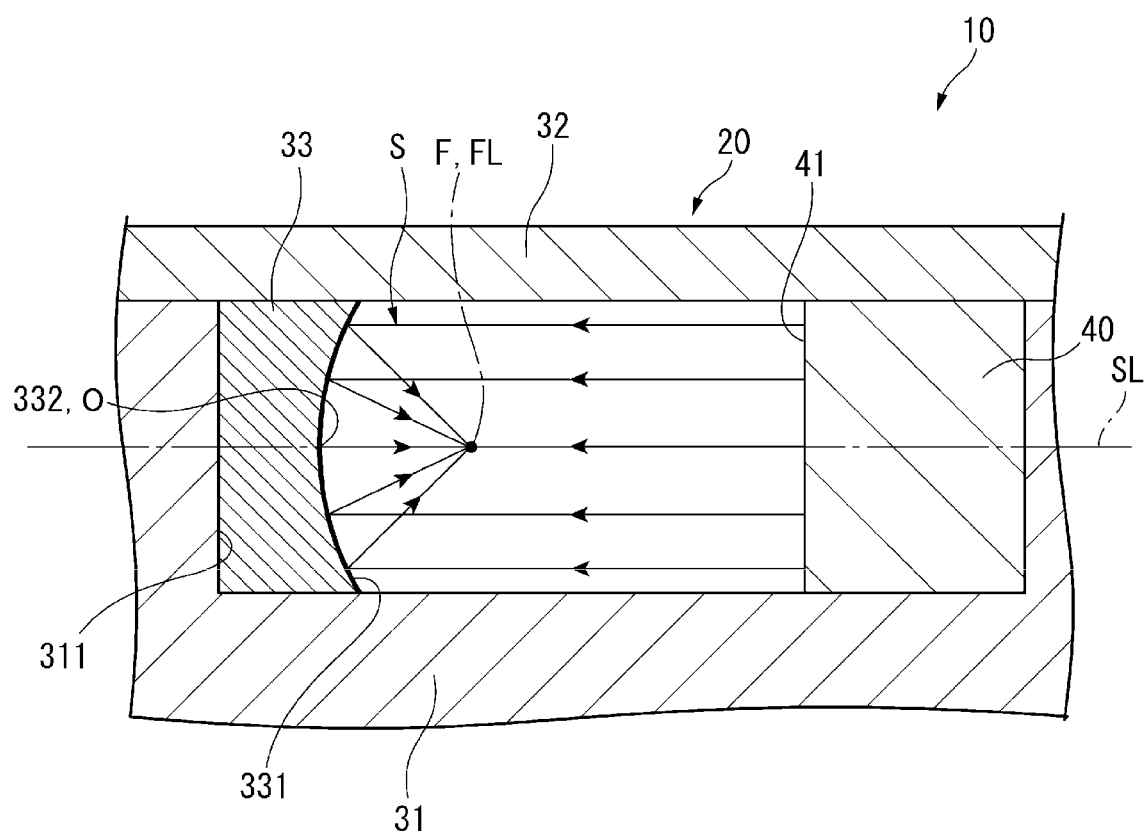
FIG. 2 is a cross-sectional view taken along a line A-A in FIG. 1.
Figure 2:
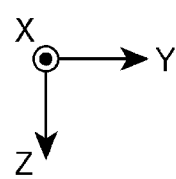

FIG. 1 is a cross-sectional view schematically showing a part of a fluid device 10 according to the present embodiment, and FIG. 2 is a cross-sectional view taken along a line A-A in FIG. 1. This fluid device 10 includes a flow path substrate 30 on which a flow path 20 is formed, and an ultrasonic wave application device 40 provided on the flow path substrate 30. In the following description, a flow direction of a fluid S flowing through the flow path 20 is referred to as an X direction, a direction orthogonal to the X direction is referred to as a Y direction, and a direction orthogonal to the X direction and the Y direction is referred to as a Z direction.

In the fluid device 10 according to the present embodiment, an ultrasonic wave transmitted from the ultrasonic wave application device 40 is applied to the fluid S flowing through a convergence region R that is a partial region of the flow path 20 in the X direction, and micro-particles or fine fibers (hereinafter referred to as micro-particles M) dispersed in the fluid S are converged. The fluid S is not particularly limited, and is, for example, water.

In such a fluid device 10, for example, the micro-particles M in the flow path 20 can be concentrated by providing, in the flow path 20, a fluid inlet through which the fluid S flows into the flow path 20 and a fluid outlet through which the fluid S flows out of the flow path 20.

Alternatively, the micro-particles M in the fluid S can be concentrated by providing, in the flow path 20, a concentration flow path for selectively circulating the fluid S containing the converged micro-particles M and a discharge flow path for selectively circulating other fluids S.

In FIG. 1, a state of the micro-particles M converged in the flow path 20 is schematically illustrated. In FIG. 2, the illustration of the micro-particles M is omitted, and traveling directions of ultrasonic waves incident into the flow path 20 are indicated by arrows.

Flow Path Substrate 30

As shown in FIGS. 1 and 2, the flow path substrate 30 includes a base substrate 31, a lid substrate 32 (see FIG. 2), and a wall portion 33. The base substrate 31 is provided with a concave groove 311 that is concave toward a +Z side along the X direction, and the lid substrate 32 is disposed to cover the concave groove 311 of the base substrate 31. The wall portion 33 is disposed along one side surface in the concave groove 311, and has a reflection surface 331 serving as a flow path wall surface. The flow path 20 is mainly formed by a lower surface of the lid substrate 32, the other side surface and a bottom surface in the concave groove 311 of the base substrate 31, and the reflection surface 331 of the wall portion 33.

In addition, in the convergence region R that is the partial region of the flow path 20 in the X direction, the concave groove 311 of the base substrate 31 includes a portion having a width in the Y direction formed larger than other portions, and the ultrasonic wave application device 40 is disposed in this portion to face the reflection surface 331 of the wall portion 33.

Figure 3:
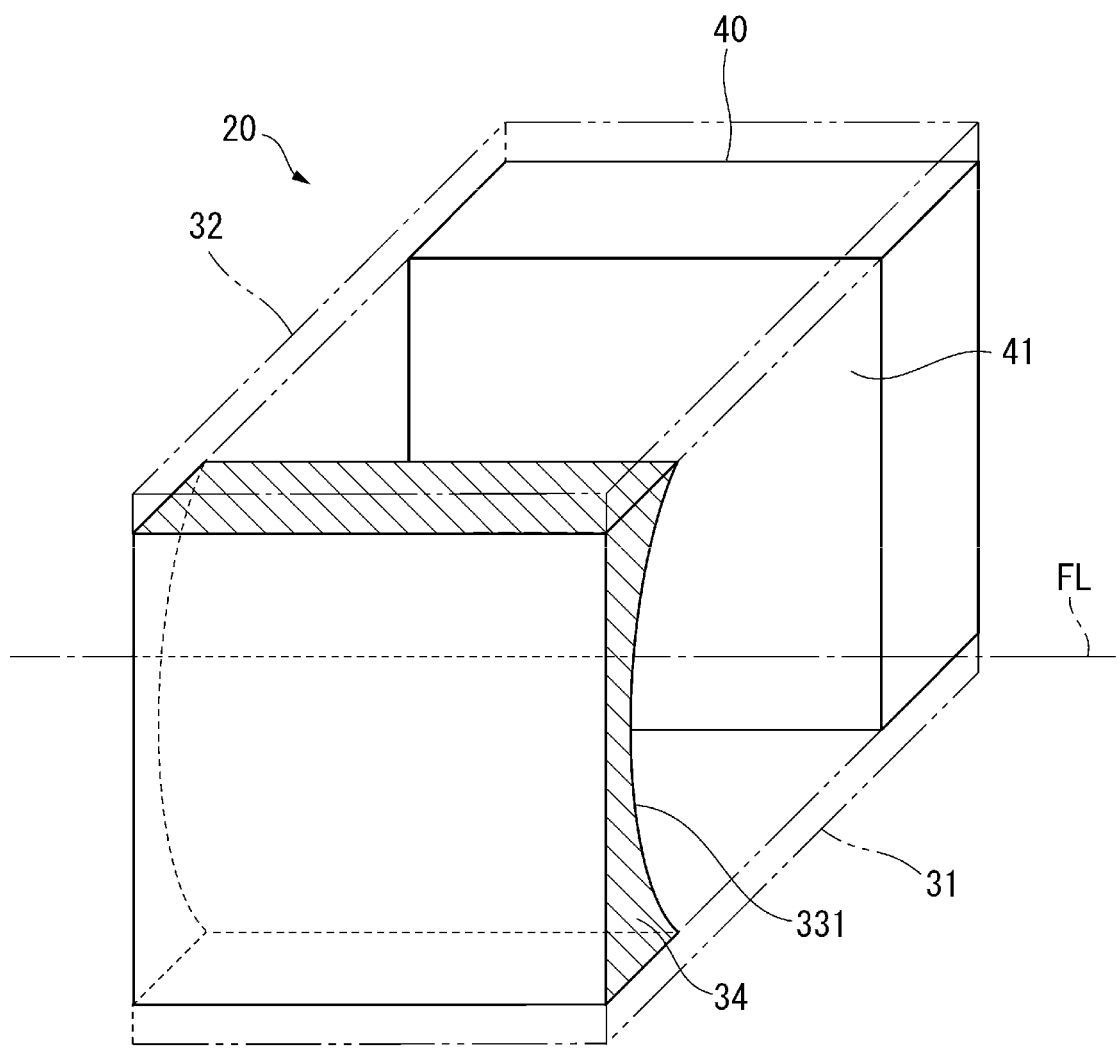
FIG. 3 is a perspective view schematically showing a convergence region of a flow path in the fluid device according to the first embodiment.

Here, FIG. 3 is a perspective view schematically showing the convergence region R of the flow path 20. In FIG. 3, the wall portion 33 and the ultrasonic wave application device 40 are indicated by solid lines, and portions of the base substrate 31 and the lid substrate 32 that face the flow path 20 are indicated by broken lines.

As shown in FIG. 3, the convergence region R of the flow path 20 is formed by the lower surface of the lid substrate 32, the bottom surface in the concave groove 311 of the base substrate 31, the reflection surface 331 of the wall portion 33, and an ultrasonic wave application surface 41 of the ultrasonic wave application device 40.

Reflection Surface 331

As shown in FIG. 2, the reflection surface 331 has a parabolic shape having an axis parallel to the Y direction as a symmetric axis SL in a cross-sectional view (that is, a YZ cross-sectional view) in a plane orthogonal to a flow direction (X-direction) of the fluid, and this parabolic shape forms a focal point F in the flow path 20.

For example, when a YZ cross section of the reflection surface 331 has a parabolic shape represented by the following Equation (1), a distance from an origin O of the parabolic shape to the focal point F is ¼a. Here, the flow path 20 is formed such that the shortest distance from a portion (bottom portion 332) corresponding to the origin O of the parabolic shape of the reflection surface 331 to the ultrasonic wave application surface 41 is larger than a distance (that is, ¼a) from the bottom portion 332 to the focal point F.

$$y = ax^2 \quad \text{Equation (1)}$$

Further, as shown in FIG. 3, the reflection surface 331 forms in the flow path 20 a linear focal point FL in which the focal point F of the parabolic shape described above is continuous in the X direction.

In such a configuration, when the ultrasonic wave in a direction along the symmetric axis SL (that is, the Y direction) is incident on the reflection surface 331, an incident angle and a reflection angle of the ultrasonic wave are symmetrical with respect to a normal line of the reflection surface 331, and the ultrasonic wave reflected by the reflection surface 331 is converged on the linear focal point FL.

Ultrasonic Wave Application Device 40

The ultrasonic wave application device 40 includes one or more ultrasonic elements, and transmits ultrasonic waves that are planar waves to the reflection surface 331. The ultrasonic element includes, for example, a piezoelectric actuator or a vibration plate as a vibrator.

For example, when the ultrasonic element includes the piezoelectric actuator as the vibrator, a drive voltage is applied to the piezoelectric actuator, whereby the piezoelectric actuator is vibrated to generate ultrasonic waves.

When the ultrasonic element includes the vibration plate as the vibrator, a drive voltage is applied to a piezoelectric thin film formed on the vibration plate, whereby the vibration plate is vibrated to generate the ultrasonic waves.

Alternatively, the ultrasonic element may include the vibration plate as the vibrator and a substrate disposed to face the vibration plate, and electrodes formed on the vibration plate and the substrate may form an electrostatic actuator. In this case, a drive voltage is applied to the electrostatic actuator, whereby the ultrasonic element vibrates the vibration plate to generate ultrasonic waves.

The ultrasonic wave application device 40 may include not only the ultrasonic element described above but also an acoustic matching layer, an acoustic lens, and the like.

A frequency of the ultrasonic wave generated by the ultrasonic element in the ultrasonic wave application device 40 is not particularly limited, and the ultrasonic wave is preferably an ultrasonic wave in a frequency band of 300 kHz to 50 MHz. For example, in a low frequency band of the ultrasonic wave, specifically, in a frequency band of 10 kHz to 300 kHz, cavitation occurs in the fluid S, and thus capture of the micro-particles M in the fluid S is inappropriate. Therefore, it is preferable to use an ultrasonic wave having a frequency of 300 kHz or more. When an ultrasonic wave in a frequency band of 50 MHz or less is used, a general drive source can be used as a drive source of the ultrasonic element.

In the present embodiment, the ultrasonic wave application device 40 has the ultrasonic wave application surface 41 that applies, to the fluid S, the ultrasonic wave transmitted from the ultrasonic element described above. Here, the ultrasonic wave application surface 41 may be formed by the vibration plate forming the ultrasonic element. When the ultrasonic wave application device 40 includes the acoustic matching layer or the acoustic lens, the ultrasonic wave application surface 41 may be formed by the acoustic matching layer or the acoustic lens. As described above, this ultrasonic wave application surface 41 is a part of the flow path wall surface forming the convergence region R of the flow path 20.

In the present embodiment, it is preferable that the ultrasonic wave application device 40 transmits an ultrasonic wave having high directivity toward the reflection surface 331. Specifically, it is desirable that a short-distance sound field limit N of the ultrasonic wave transmitted from the ultrasonic wave application device 40 is larger than the shortest distance from the ultrasonic wave application surface 41 to the bottom portion 332 of the reflection surface 331.

Here, the short-distance sound field limit N of the ultrasonic wave transmitted from the ultrasonic wave application device 40 according to the present embodiment is represented by the following Equation (2) or Equation (3). Specifically, when a shape of a vibration region (hereinafter, referred to as a vibration portion) of the vibration plate forming the ultrasonic element of the ultrasonic wave application device 40 is circular, the following Equation (2) is established, and when the shape of the vibration portion is rectangular, the following Equation (3) is established.

$$N = d^2 \cdot \frac{f}{4c} \qquad \text{Equation (2)}$$

$$N = kL^2 \cdot \frac{f}{4c} \qquad \text{Equation (3)}$$

In the above Equations (2) and (3), f is the frequency (Hz) of the ultrasonic wave, and c is a sound velocity (m/s). In the above Equation (2), d is a diameter (m) of the circular vibration portion, and in the above Equation (3), L is a long side dimension (m) of the rectangular vibration portion. A predetermined coefficient k in the above Equation (3) is defined as shown in the following Table 1. A dimensional ratio in the following Table 1 is a dimension ratio of a short side to a long side of the vibration portion, and when the dimensional ratio is 1, the shape of the vibration portion is a square. Since a maximum value of the dimension ratio is 1, a maximum value of the predetermined coefficient k is 1.37.

TABLE 1

| Dimension Ratio | k |
| --- | --- |
| 1 | 1.37 |
| 0.9 | 1.25 |
| 0.8 | 1.15 |
| 0.7 | 1.09 |
| 0.6 | 1.04 |
| 0.5 | 1.01 |
| 0.4 | 1 |
| 0.3 | 0.99 |

Capture of Micro-Particles M

According to the above configuration, the ultrasonic wave applied to the fluid S from the ultrasonic wave application surface 41 is incident on the reflection surface 331 in the direction along the symmetric axis SL (that is, the Y direction). The ultrasonic waves reflected by the reflection surface 331 are concentrated on the linear focal point FL, causing constructive interference. Accordingly, sound pressures are concentrated on the linear focal point FL, a sound pressure gradient is generated such that the micro-particles M stay on the linear focal point FL, and the micro-particles M in the fluid S are captured in the vicinity of the linear focal point FL.

Effects of First Embodiment

As described above, the fluid device 10 according to the present embodiment includes the flow path 20 through which the fluid S flows, and the ultrasonic wave application device 40 that transmits the ultrasonic wave, in which the flow path 20 has, as the flow path wall surfaces, the ultrasonic wave application surface 41 that applies the ultrasonic wave to the fluid S, and the reflection surface 331 that reflects the ultrasonic wave applied to the fluid S from the ultrasonic wave application surface 41, and the reflection surface 331 has a concave curved surface shape. In particular, in the present embodiment, the YZ cross section of the reflection surface 331 has a parabolic shape that forms the focal point F in the flow path 20.

According to such a configuration, the reflection surface 331 forms the linear focal point FL in which the focal point F is continuous in the flow path 20, and the ultrasonic wave reflected by the reflection surface 331 is concentrated on the linear focal point FL in the flow path 20. Accordingly, a region where a strong sound pressure acts in the vicinity of the linear focal point FL in the flow path 20 can be generated, and the micro-particles M can be captured in the region.

Therefore, in the fluid device 10 according to the present embodiment, it is not necessary to generate a standing wave which should be generated under strict conditions, and it is easy to capture the micro-particles M at a desired position.

In the fluid device 10 according to the present embodiment, the ultrasonic wave application surface 41 faces the reflection surface 331. According to such a configuration, since the ultrasonic wave transmitted from the ultrasonic wave application surface 41 is likely to be incident on the reflection surface 331 along the symmetric axis SL of the parabolic shape, the ultrasonic wave can be preferably concentrated on the linear focal point FL in the flow path 20. As a result, the micro-particles M can be more preferably captured.

The fluid device 10 described above can appropriately separate the micro-particles M contained in the fluid S, and a range of use of the fluid device 10 can be expanded. For example, the micro-particles M contained in domestic wastewater can be separated by causing the domestic wastewater discharged from a washing machine or a kitchen to flow into the fluid device 10. In this case, fine plastic fibers contained in washing water and abrasive powders of detergent and the like contained in drainage of the kitchen can be separated, and environmental damage due to harmful substances such as plastic garbage can be prevented.

The fluid device 10 can also be preferably used for separation of the micro-particles M dispersed in a medium such as an industrial product or a pharmaceutical product, separation of cells and viruses in a liquid, and the like.

Second Embodiment

Next, a fluid device according to a second embodiment will be described with reference to FIGS. 4 to 6. The same components as those of the first embodiment are denoted by the same reference numerals, and the description thereof may be omitted or simplified.

Figure 4:
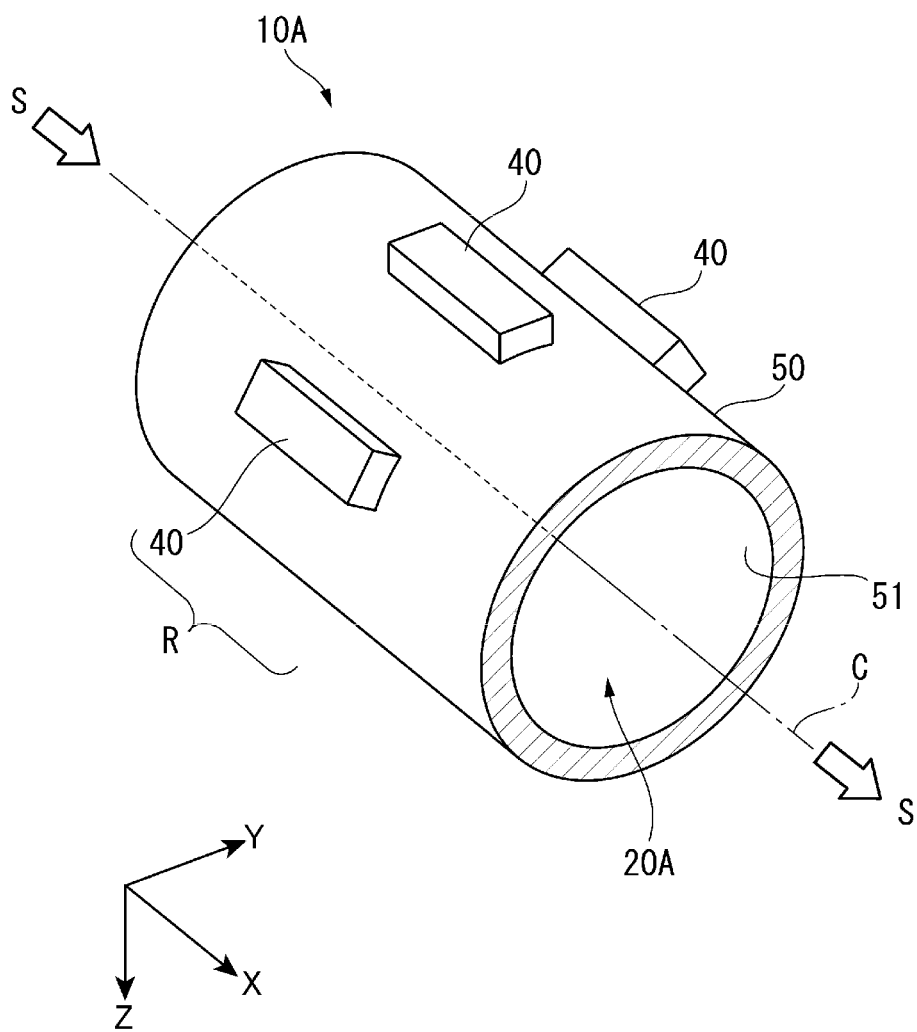
FIG. 4 is a perspective view schematically showing a part of a fluid device according to a second embodiment.
Figure 5:
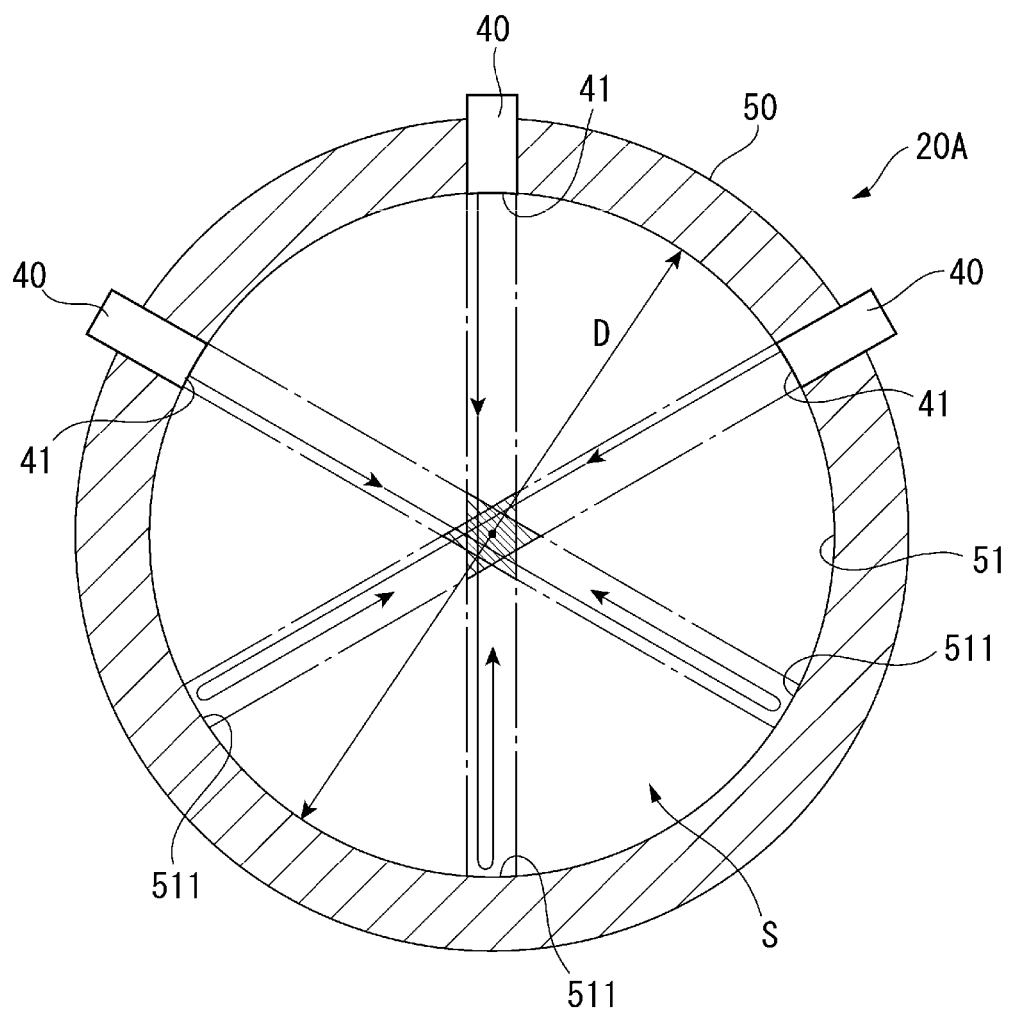
FIG. 5 is a cross-sectional view schematically showing the fluid device according to the second embodiment.

FIG. 4 is a perspective view schematically showing a part of a fluid device 10A according to the second embodiment, and FIG. 5 is a cross-sectional view of the fluid device 10A according to the second embodiment cut along a plane orthogonal to the flow direction of the fluid S.

As shown in FIGS. 4 and 5, the fluid device 10A includes a cylinder member 50 and a plurality of ultrasonic wave application devices 40 provided in the cylinder member 50, and forms a flow path 20A through which the fluid S flows in the X direction. In this fluid device 10A, as in the first embodiment, the ultrasonic waves transmitted from the ultrasonic wave application devices 40 are applied to the fluid S flowing through the convergence region R that is a partial region of the flow path 20A in the X direction, so that the micro-particles M dispersed in the fluid S are converged.

The cylinder member 50 has a cylinder shape having a central axis C along the X direction, and the flow path 20A in the fluid device 10A is mainly formed by an inner peripheral surface 51 of the cylinder member 50. The inner peripheral surface 51 of the cylinder member 50 has a circular shape centered on the central axis C in the cross-sectional view (that is, the YZ cross-sectional view) in the plane orthogonal to the flow direction of the fluid S.

The ultrasonic wave application devices 40 each have a configuration the same as that of the first embodiment. In the present embodiment, the ultrasonic wave application devices 40 are disposed in through holes formed in the cylinder member 50, and each have the ultrasonic wave application surface 41 serving as the flow path wall surface. That is, in the present embodiment, the convergence region R of the flow path 20A is formed by the inner peripheral surface 51 of the cylinder member 50 and the ultrasonic wave application surfaces 41 of the ultrasonic wave application devices 40.

Further, it is assumed that the plurality of ultrasonic wave application devices 40 are disposed at different positions from one another on the same circumference centered on the central axis C of the cylinder member 50, and transmit the ultrasonic waves having phases aligned with each other.

In the present embodiment, it is preferable that each of the ultrasonic wave application surfaces 41 of the plurality of ultrasonic wave application devices 40 has an arc shape of the circle same as the inner peripheral surface 51 of the cylinder member 50 in the cross-sectional view (that is, the YZ cross-sectional view) in the plane orthogonal to the flow direction of the fluid S. Such an ultrasonic wave application surface 41 applies the ultrasonic wave in a radial direction of the cylinder member 50 toward the central axis C of the cylinder member 50. It is preferable that such an ultrasonic wave application surface 41 is formed by, for example, the acoustic matching layer, the acoustic lens, or the like forming the ultrasonic wave application device 40.

In the present embodiment, it is preferable that the ultrasonic wave application device 40 transmits the ultrasonic wave having high directivity. Specifically, it is preferable that the short-distance sound field limit N of the ultrasonic wave transmitted from the ultrasonic wave application device 40 is larger than a flow path diameter D that is a diameter (that is, a diameter of a flow path cross section) of the inner peripheral surface 51 of the cylinder member 50. The Equations (2) or (3) described in the first embodiment can be used as an equation for obtaining the short-distance sound field limit N.

According to the above configuration, the ultrasonic wave applied to the fluid S from the ultrasonic wave application surface 41 passes through the central axis C of the cylinder member 50, and reaches a region (that is, a reflection surface 511) of the inner peripheral surface 51 of the cylinder member 50 facing the ultrasonic wave application surface 41. This ultrasonic wave is incident on the reflection surface 511 at an incident angle of 0°, is reflected by the reflection surface 511 and thereby travels in a direction 180° with respect to the incident direction and passes through the central axis C again in the flow path 20A. Therefore, the ultrasonic wave applied to the fluid S from the ultrasonic wave application surface 41 and the ultrasonic wave reflected by the reflection surface 511 are concentrated on the central axis C, causing constructive interference.

Here, the cylinder member 50 according to the present embodiment is provided with the plurality of (for example, three) ultrasonic wave application devices 40, and the inner peripheral surface 51 of the cylinder member 50 has a plurality of (for example, three) reflection surfaces 511 facing the respective ultrasonic wave application surfaces 41. YZ cross sections of the inner peripheral surface 51 and the reflection surfaces 511 have an arc shape of the same circle.

Therefore, in the present embodiment, as shown in FIG. 5, not only the ultrasonic wave from one ultrasonic wave application surface 41 but also the ultrasonic waves from the plurality of ultrasonic wave application surfaces 41 overlap each other in the vicinity of the central axis C. Further, the ultrasonic waves from the plurality of reflection surfaces 511 also overlap in the vicinity of the central axis C. Since phases of the ultrasonic waves from the plurality of ultrasonic wave application surfaces 41 are aligned with each other, the ultrasonic waves from the plurality of ultrasonic wave application surfaces 41 and the ultrasonic waves from the plurality of reflection surfaces 511 overlap each other in the vicinity of the central axis C, thereby causing constructive interference. Therefore, in the present embodiment, sound pressures are concentrated in the vicinity of the central axis C in the flow path 20A, a sound pressure gradient is generated such that the micro-particles M stay in the vicinity of the central axis C, and the micro-particles M in the fluid S are captured.

In the present embodiment, there is a preferable beam width range as a beam width of the ultrasonic wave applied from the ultrasonic wave application surface 41.

Specifically, when the diameter d of the circular vibration portion or the long side dimension L of the rectangular vibration portion in the ultrasonic wave application device 40 is equal to a beam width w of the ultrasonic wave, and K=kf/4c in the above Equation (2) (or K=f/4c in the above Equation (3)), the following Equation (4) is established.

$$N = Kw^2 \qquad \text{Equation (4)}$$

Then, under a condition that the flow path diameter D is smaller than the short-distance sound field limit N, a lower limit of the beam width w can be defined by the following Equations (5) to (7).

$$D < N = Kw^2 \qquad \text{Equation (5)}$$

$$\frac{D}{K} < w^2 \qquad \text{Equation (6)}$$

$$\sqrt{\frac{D}{K}} < w \qquad \text{Equation (7)}$$

Further, when the ultrasonic wave from an optional ultrasonic wave application surface 41 reaches the reflection surface 511 as an incident wave, under a condition that a reflected wave reflected from the reflection surface 511 does not directly reach the ultrasonic wave application surface 41 adjacent to the optional ultrasonic wave application surface 41, an upper limit of the beam width w can be defined.

Figure 6:
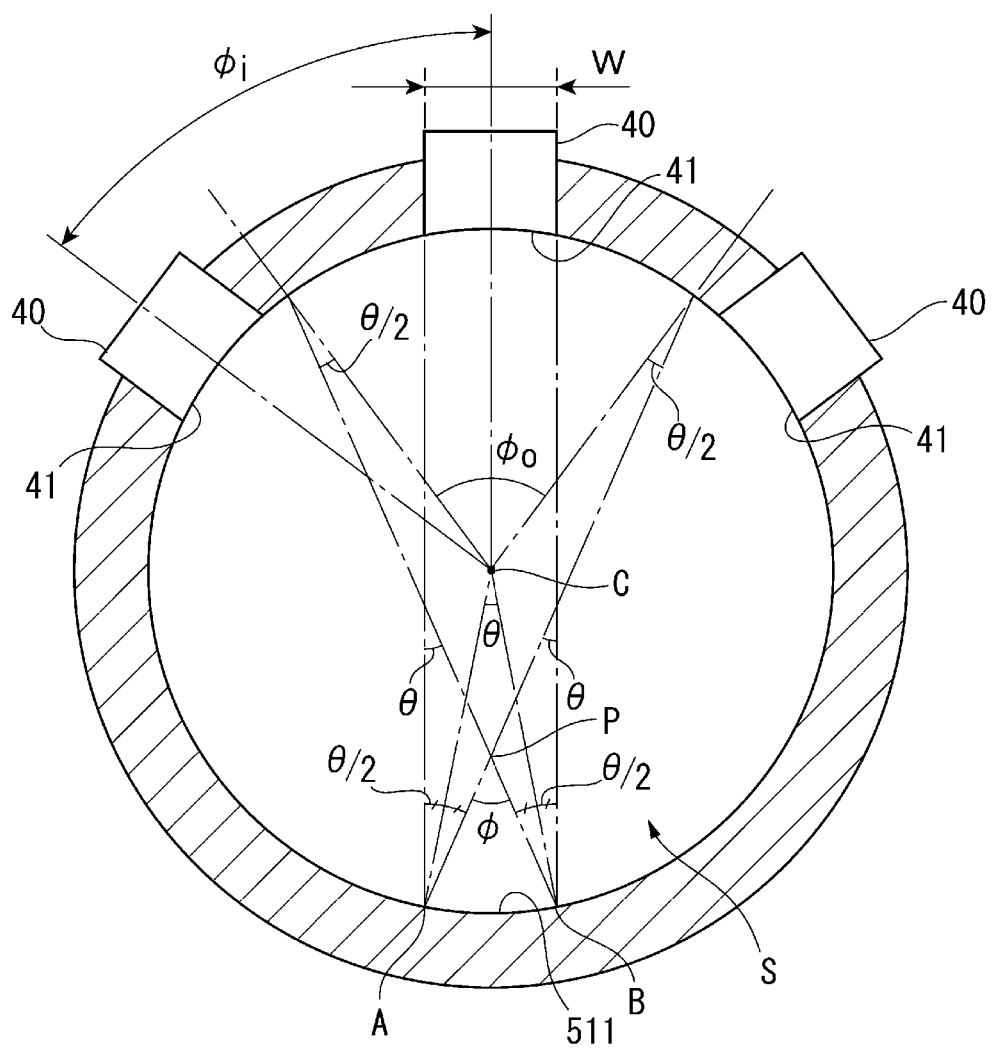
FIG. 6 is a schematic diagram illustrating a beam width of an ultrasonic wave in the fluid device according to the second embodiment.

For example, FIG. 6 is a diagram schematically showing diffusion of the ultrasonic waves from the ultrasonic wave application surfaces 41 disposed in a center of the drawing.

In FIG. 6, an angle θ of an arc formed by the reflection surface 511 at which the incident wave reaches is geometrically represented by the following Equation (8).

$$\sin\frac{\theta}{2} = \frac{w}{D} \quad \text{Equation (8)}$$

Further, in FIG. 6, an angle $\Phi_o$ of the arc formed by the region of the inner peripheral surface 51 at which the reflected wave reaches is geometrically represented by the following Equation (9).

$$\phi_0 = \phi + \theta = 3\theta \quad \text{Equation (9)}$$

$\Phi$ in the above Equation (9) is an angle formed by connecting points A and B forming both ends of the reflection surface in FIG. 6 and a point P where the reflected waves are converged once. At the point P, the reflected waves are converged once, but since the phases are shifted from each other, there is no constructive interference.

Here, in order to prevent the reflected wave from directly reaching the adjacent ultrasonic wave application surface 41, it is necessary to satisfy the following Equation (10). In the following Equation (10), $\Phi_i$ is an angle formed by central axes of the adjacent ultrasonic wave application surfaces 41, and the central axis of the ultrasonic wave application surface 41 intersects the central axis C of the cylinder member. Further, a maximum value of $\Phi_i$ is an angle when the two ultrasonic wave application devices 40 are disposed to face each other with the central axis C of the cylinder member interposed therebetween, that is, 180°.

$$\phi_0 < \phi_i \quad \text{Equation (10)}$$

According to the above Equations (8) to (10), the following Equations (11) to (13) are established.

$$\theta < \frac{\phi_i}{3} \quad \text{Equation (11)}$$

$$\frac{w}{D} < \sin\frac{\phi_i}{6} (0° < \phi_i \leq 180°) \quad \text{Equation (12)}$$

$$w < D\sin\frac{\phi_i}{6} \quad \text{Equation (13)}$$

Therefore, the beam width w is represented by the following Equation (14) based on the above Equation (7) and Equation (13).

$$\sqrt{\frac{D}{K}} < w < D\sin\frac{\phi_i}{6} \quad \text{Equation (14)}$$

Here, an example in which Equation (14) is satisfied will be described.
For $$\sqrt{\frac{D}{K}},$$

which is the lower limit of the beam width w, when $K = kf/4c$ and $k \leq 1.37$, the following Equation (15) is established.

$$\sqrt{\frac{D}{K}} = \sqrt{\frac{4cD}{kf}} \geq \sqrt{\frac{4cD}{1.37f}} \quad \text{Equation (15)}$$

For $$D\sin\frac{\phi_i}{6},$$

which is the upper limit of the beam width w, when the maximum value of $\Phi_i$ is set to 180°, the following Equations (16) and (17) are established.

$$\sin\frac{\phi_i}{6} \leq \sin 30° = 1/2 \quad \text{Equation (16)}$$

$$D\sin\frac{\phi_i}{6} \leq \frac{D}{2} \quad \text{Equation (17)}$$

When the above Equations (15) and (17) are substituted into the above Equation (14), the following Equation (18) is established.

$$\sqrt{\frac{4cD}{1.37f}} < w < \frac{D}{2} \quad \text{Equation (18)}$$

Therefore, in the present embodiment, it is preferable that the beam width w satisfies the above Equation (18). The beam width w is equal to the width of the ultrasonic wave application surface 41, specifically, the diameter D of the circular vibration portion or the long side dimension L of the rectangular vibration portion of the ultrasonic wave application device 40.

Effects of Second Embodiment

As in the first embodiment, the fluid device 10A according to the present embodiment has the reflection surface 511 having a concave curved surface shape. The ultrasonic wave application surface 41 faces the reflection surface 511, and the ultrasonic wave application surface 41 and the reflection surface 511 have a concentric arc shape centered on the central axis C in the flow path 20A (corresponding to a virtual point in the flow path 20A) in the YZ cross-sectional view.

According to such a configuration, the ultrasonic wave applied from the ultrasonic wave application surface 41 and the ultrasonic wave reflected by the reflection surface 511 are converged in the vicinity of the central axis C in the flow path 20A, so that the region where the strong sound pressure acts can be generated in the flow path 20A, and the micro-particles M can be captured in the region.

Therefore, as in the first embodiment, in the fluid device 10A according to the present embodiment, it is also not necessary to generate the standing wave which should be generated under strict conditions, and it is so easy to capture the micro-particles M at a desired position.

In the fluid device 10A according to the present embodiment, the flow path 20A includes the plurality of ultrasonic wave application surfaces 41 and the plurality of reflection surfaces 511 facing the plurality of ultrasonic wave application surfaces 41, and the plurality of ultrasonic wave application surfaces 41 and the plurality of reflection surfaces 511 have concentric arc shapes centered on the central axis C (corresponding to the same virtual point) in the flow path 20A. According to such a configuration, the ultrasonic waves applied from the plurality of ultrasonic wave application surfaces 41 and the ultrasonic waves reflected by the plurality of reflection surfaces 511 are converged in the vicinity of the central axis C in the flow path 20A, so that the region where a stronger sound pressure acts can be generated in the flow path 20A, and the micro-particles M can be preferably captured.

In the fluid device 10A according to the present embodiment, phases of the ultrasonic waves applied to the fluid S from the plurality of ultrasonic wave application surfaces 41 coincide with one another. According to such a configuration, the ultrasonic waves converged in the vicinity of the central axis C in the flow path 20A can preferably cause constructive interference.

It is preferable that in the fluid device 10A according to the present embodiment, the width of the ultrasonic wave application surface 41 (that is, the beam width w) satisfies the above Equation (14), in particular, the above Equation (18). According to such a configuration, the adjacent ultrasonic wave application surfaces 41 do not adversely affect each other, and the ultrasonic waves having high directivity can be emitted toward the corresponding reflection surfaces 511. Accordingly, the micro-particles M can be preferably captured.

Modification

The present disclosure is not limited to the embodiment described above, and configurations obtained through modifications, alterations, and appropriate combinations of the embodiments within a scope of being capable of achieving the object of the present disclosure are included in the present disclosure.

In the first embodiment and the second embodiment, the ultrasonic wave application device 40 has the ultrasonic wave application surface 41 serving as the flow path wall surface, but a wall member may be disposed between the ultrasonic wave application device 40 and the fluid S, and the wall member may have a ultrasonic wave application surface serving as the flow path wall surface. That is, the ultrasonic wave transmitted from the ultrasonic wave application device 40 may be applied to the fluid S via the wall member.

Figure 7:
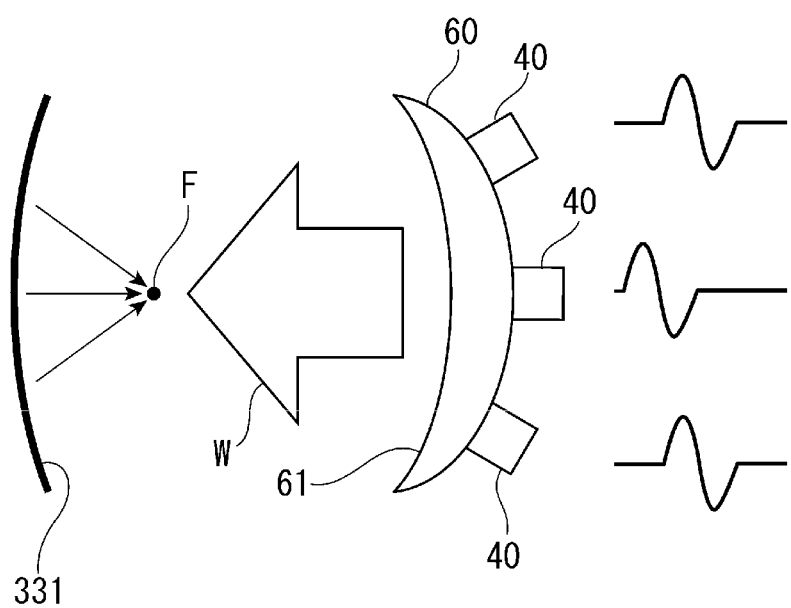
FIG. 7 is a schematic diagram illustrating a fluid device according to a modification of the first embodiment.

In the fluid device 10 according to the first embodiment, one ultrasonic wave application device 40 having the planar ultrasonic wave application surface 41 is provided. As a modification, as shown in a schematic diagram in FIG. 7, a wall member 60 forming the flow path wall surface may be employed, and the plurality of ultrasonic wave application devices 40 may be provided to the wall member 60. In this case, the wall member 60 has an ultrasonic wave application surface 61 that applies to the fluid S a corresponding ultrasonic wave transmitted from the plurality of ultrasonic wave application devices 40. In addition, it is preferable that the plurality of ultrasonic wave application devices 40 form a planar wave W from the ultrasonic wave application surface 61 toward the reflection surface 331 by shifting phases of transmission waves to each other in accordance with the respective positions.

In the second embodiment, the ultrasonic wave application surface 41 and the reflection surface 511 have an arc shape of the same circle, but the present disclosure is not limited thereto. For example, the ultrasonic wave application surface 41 and the reflection surface 511 facing the ultrasonic wave application surface 41 may have an arc shape of concentric circles having different diameters from each other.

The fluid device 10A according to the second embodiment has the plurality of ultrasonic wave application surfaces 41 and the plurality of reflection surfaces 511 facing the respective ultrasonic wave application surfaces 41, but the present disclosure is not limited thereto. The fluid device 10A may has one ultrasonic wave application surface 41 and one reflection surface 511 facing the ultrasonic wave application surface 41.

In the first embodiment, the reflection surface 331 serving as the flow path wall surface has a parabolic shape in the YZ cross-sectional view, and in the second embodiment, the reflection surface 511 serving as the flow path wall surface has an arc shape in the YZ cross-sectional view, but the present disclosure is not limited thereto. That is, the reflection surface 331 in the first embodiment or the reflection surface 511 in the second embodiment may have an optional concave curved surface shape.

Conclusion of Present Disclosure

A fluid device according to a first aspect of the present disclosure includes a flow path through which a fluid flows and an ultrasonic element that transmits an ultrasonic wave, in which the flow path has an ultrasonic wave application surface that applies, to the fluid, the ultrasonic wave transmitted from the ultrasonic element, and a reflection surface that reflects the ultrasonic wave applied to the fluid from the ultrasonic wave application surface, and the reflection surface has a concave curved surface shape.

According to such a configuration, the ultrasonic waves reflected by the reflection surface having a concave curved surface shape cause constructive interference in the flow path, so that a region where a strong sound pressure acts can be generated, and micro-particles can be captured in the region. Therefore, it is not necessary to generate a standing wave which should be generated under strict conditions, and it is possible to provide a fluid device that can easily capture the micro-particles at a desired position.

In the fluid device according to the first aspect, the reflection surface may have a parabolic shape that forms a focal point in the flow path in a cross-sectional view in a plane intersecting a flow direction of the fluid. In such a configuration, the reflection surface forms a linear focal point in which the focal point is continuous in the flow path, and the ultrasonic wave reflected by the reflection surface is concentrated on the linear focal point in the flow path. Accordingly, the region where the strong sound pressure acts in the vicinity of the linear focal point in the flow path can be preferably generated.

In the fluid device according to the first aspect, the ultrasonic wave application surface may face the reflection surface. According to such a configuration, since the ultrasonic wave transmitted from the ultrasonic wave application surface is likely to be incident on the reflection surface along the symmetric axis of the parabolic shape, the ultrasonic wave can be preferably concentrated on the linear focal point in the flow path.

In the fluid device according to the first aspect, the ultrasonic wave application surface may face the reflection surface, and the ultrasonic wave application surface and the reflection surface may have a concentric arc shape centered on a virtual point in the flow path in the cross-sectional view in the plane intersecting the flow direction of the fluid. According to such a configuration, the ultrasonic wave applied from the ultrasonic wave application surface and the ultrasonic wave reflected by the reflection surface are converged in the vicinity of the virtual point in the flow path, so that the region where the strong sound pressure acts can be generated in the flow path, and the micro-particles can be captured in the region.

The fluid device according to the first aspect may further include: a plurality of the ultrasonic elements, in which the flow path has a plurality of the ultrasonic wave application surfaces that apply, to the fluid, a corresponding ultrasonic wave from the plurality of ultrasonic elements, and a plurality of the reflection surfaces facing the plurality of ultrasonic wave application surfaces, and the plurality of ultrasonic wave application surfaces and the plurality of reflection surfaces may have concentric arc shapes centered on a same virtual point in the cross-sectional view. According to such a configuration, the ultrasonic waves applied from the plurality of ultrasonic wave application surfaces and the ultrasonic waves reflected by the plurality of reflection surfaces are converged in the vicinity of the virtual point in the flow path, so that the region where the stronger sound pressure acts can be generated in the flow path.

In the fluid device according to the first aspect, phases of the ultrasonic waves transmitted from the plurality of ultrasonic elements may coincide with one another. According to such a configuration, the ultrasonic waves converged in the vicinity of the virtual point in the flow path can preferably cause constructive interference.

In the fluid device according to the first aspect, the flow path may have a circular flow path cross section, and $$\sqrt{\frac{4cD}{1.37f}} < w < \frac{D}{2},$$

in which D is a diameter of the flow path cross section, f is a frequency of the ultrasonic wave, c is a sound velocity of the ultrasonic wave, and w is a width of the ultrasonic wave application surface. According to such a configuration, adjacent ultrasonic wave application surfaces do not adversely affect each other, and ultrasonic waves having high directivity can be emitted toward the corresponding reflection surfaces. Accordingly, the micro-particles can be preferably captured.

What is claimed is:

1. A fluid device comprising:
   a flow path through which a fluid flows; and
   at least one ultrasonic element of a plurality of ultrasonic elements that transmits an ultrasonic wave of a plurality of ultrasonic waves, wherein
   the flow path includes:
      at least one ultrasonic wave application surface of a plurality of ultrasonic wave application surfaces that applies, to the fluid, the ultrasonic wave transmitted from the at least one ultrasonic element, and
      a reflection surface of a plurality of reflection surfaces that reflects the ultrasonic wave applied to the fluid from the at least one ultrasonic wave application surface, wherein
         the reflection surface has a concave curved surface shape,
         the at least one ultrasonic wave application surface faces the reflection surface, and
         the at least one ultrasonic wave application surface and the reflection surface have a concentric arc shape centered on a virtual point in the flow path in a cross-sectional view in a plane intersecting a flow direction of the fluid.

2. The fluid device according to claim 1, wherein the reflection surface has a parabolic shape that forms a focal point in the flow path in the cross-sectional view in the plane intersecting the flow direction of the fluid.

3. The fluid device according to claim 2, wherein the at least one ultrasonic wave application surface faces the reflection surface.

4. The fluid device according to claim 1, further comprising:
   the plurality of ultrasonic elements, wherein
      the flow path has the plurality of ultrasonic wave application surfaces that apply, to the fluid, a corresponding ultrasonic wave of the plurality of ultrasonic waves from the plurality of ultrasonic elements,
      the plurality of reflection surfaces that face the plurality of ultrasonic wave application surfaces, and
      the plurality of ultrasonic wave application surfaces and the plurality of reflection surfaces have concentric arc shapes centered on the virtual point in the cross-sectional view.

5. The fluid device according to claim 4, wherein phases of the plurality of ultrasonic waves transmitted from the plurality of ultrasonic elements coincide with one another.

6. The fluid device according to claim 4, wherein the flow path has a circular flow path cross section, and $$\sqrt{\frac{4cD}{1.37f}} < w < \frac{D}{2},$$

where D is a diameter of the circular flow path cross section, f is a frequency of the ultrasonic wave, c is a sound velocity of the ultrasonic wave, and w is a width of the at least one ultrasonic wave application surface.

* * * * *